United States Patent

Dent

[19]

[11] Patent Number: 5,960,364
[45] Date of Patent: *Sep. 28, 1999

[54] SATELLITE/CELLULAR PHONE USING DIFFERENT CHANNEL SPACINGS ON FORWARD AND RETURN LINKS

[75] Inventor: Paul W. Dent, Pittsboro, N.C.

[73] Assignee: Ericsson Inc., Research Triangle Park, N.C.

[*] Notice: This patent is subject to a terminal disclaimer.

[21] Appl. No.: 08/746,338

[22] Filed: Nov. 8, 1996

[51] Int. Cl.$^6$ .................................................. H04B 1/00
[52] U.S. Cl. ........................ 455/552; 455/12.1; 455/13.1
[58] Field of Search ............................ 455/76, 552, 553, 455/12.1, 13.1, 13.2, 13.3, 84, 86, 302, 317; 327/105; 370/280; 375/281, 279

[56] References Cited

U.S. PATENT DOCUMENTS

| | | |
|---|---|---|
| 4,234,929 | 11/1980 | Riley, Jr. . |
| 4,972,455 | 11/1990 | Phillips et al. ............................ 455/552 |
| 5,008,925 | 4/1991 | Pireh ........................................ 455/552 |
| 5,020,092 | 5/1991 | Phillips et al. ............................. 455/76 |
| 5,020,093 | 5/1991 | Pireh ........................................ 445/552 |
| 5,048,059 | 9/1991 | Dent . |
| 5,073,900 | 12/1991 | Mallinckrodt . |
| 5,095,288 | 3/1992 | Dent . |
| 5,111,162 | 5/1992 | Hietala et al. . |
| 5,129,095 | 7/1992 | Davis et al. . |
| 5,152,005 | 9/1992 | Bickley . |
| 5,175,872 | 12/1992 | Borrass ..................................... 455/76 |
| 5,180,933 | 1/1993 | Krzyzanowski . |
| 5,187,805 | 2/1993 | Bertiger et al. . |
| 5,289,506 | 2/1994 | Kitayama et al. . |
| 5,406,615 | 4/1995 | Miller, II et al. ......................... 455/552 |
| 5,465,409 | 11/1995 | Boprras et al. ............................. 455/76 |
| 5,475,677 | 12/1995 | Arnold et al. ........................... 455/552 |
| 5,483,679 | 1/1996 | Sasaki ...................................... 455/76 |
| 5,511,235 | 4/1996 | Duong et al. .............................. 455/76 |
| 5,511,536 | 4/1996 | Umstattd et al. .......................... 455/76 |
| 5,519,885 | 5/1996 | Vaisanen ................................... 455/76 |
| 5,535,432 | 7/1996 | Dent ......................................... 455/76 |
| 5,539,730 | 7/1996 | Dent . |
| 5,564,076 | 10/1996 | Auvray .................................... 455/553 |
| 5,603,097 | 2/1997 | Kanou ....................................... 455/76 |
| 5,640,686 | 6/1997 | Norimatsu ............................... 455/552 |
| 5,732,330 | 3/1998 | Anderson et al. ......................... 455/76 |
| 5,734,970 | 3/1998 | Saito ........................................ 455/76 |

FOREIGN PATENT DOCUMENTS

| | | |
|---|---|---|
| 536 921 | 4/1993 | European Pat. Off. . |
| WO96/08878 | 3/1996 | WIPO . |

OTHER PUBLICATIONS

F.M. Gardner, "Phaselock Techniques," Wiley 1979, ISBB 0–471–024294–3, pp. 8–91.

F.D. Priscoli et al., "Study on the Integration Between the GSM Cellular Network and a Satellite System," IEEE Global Telecommunications Conference, Houston, TX vol. 1, Nov. 29, 1993, pp. 588–592.

*Primary Examiner*—Reinhard J. Eisenzopf
*Assistant Examiner*—Makoto Aoki
*Attorney, Agent, or Firm*—Burns, Doane, Swecker & Mathis, LLP

[57] ABSTRACT

A wireless apparatus is described having a transmitter and a receiver controlled by a frequency synthesizer arrangement to operate on a transmit frequency channel and a receive frequency channel respectively. The transmit frequency channels are not spaced by the same amount in the transmit frequency band as the receive channels are spaced in the receive band, but by a sub-multiple of the receive channel spacing, for example.

16 Claims, 4 Drawing Sheets

SATELLITE/CELLULAR PHONE USING DIFFERENT CHANNEL SPACINGS ON FORWARD AND RETURN LINKS

FIELD OF THE DISCLOSURE

The present invention relates to mobile or portable wireless telephones that maintain a two-way communications link with a network station, which may include use of a relay station in an orbiting satellite if no land-based station is within direct range. The present invention describes a wireless telephone having a frequency synthesizer arrangement providing simultaneously different channel spacings for the forward link (downlink) and return link (uplink).

BACKGROUND

Allowed U.S. Pat. No. 5,539,730 entitled "Hybrid FDMA/TDMA/CDMA Access Methods" discloses the advantages of asymmetrically channel spaced TDMA systems using short bursts of high data rate, wideband transmission from a network to a battery operated receiving terminal while using longer bursts of narrowband transmission for transmission from the battery operated terminal to the network. U.S. Pat. No. 5,539,730 is incorporated herein by reference.

In analog cellular telephones such as those designed for the U.S. AMPS system for example, conventional single-loop digital frequency synthesizers can be employed. In such phones the channel spacing is 30 KHz and there are no requirements for extremely fast channel changing. In the pan-European digital cellular system GSM, frequency hopping is employed to mitigate the effects of slow fading. Fast frequency switching synthesizers are then needed, but as the channel steps of 200 KHz are relatively coarse, the switching speed can just be achieved by conventional techniques. Both of the above systems employ the same channel spacing for each direction of communication, i.e. base-to-mobile communication and mobile-to-base communication.

In the U.S. digital cellular system IS54, also known as Digital AMPS or D-AMPS, the channel spacing is the same as its analog predecessor AMPS at 30 KHz, but a requirement for fast frequency changing arises to permit mobile phones to scan the frequencies of surrounding base stations during short idle periods between transmit and receive bursts. U.S. Pat. Nos. 5,095,288 entitled "Variable Bandwidth Synthesizer" and 5,180,933 entitled "Fractional-N Synthesizer" describe techniques useful in obtaining fast frequency switching speeds and are both incorporated herein by reference. A synthesizer integrated circuit incorporating the teachings of the above patents is marketed by Philips as part no. UM8025.

In "Phaselock Techniques" (Floyd M. Gardener, Wiley 1979, ISBB 0-471-024294-3) Gardener illustrates a dual-loop synthesizer called "vernier loop" which permits the generation of small frequency steps while keeping the phase comparison frequency of both loops high. This is in the prior art a known alternative technique for achieving small frequency steps, fast switching and low phase noise.

In the parent disclosure, a novel synthesizer is described employing two synthesizers each conforming to the teachings of the above-incorporated patents and arranged in a vernier-loop configuration so as to achieve the switching speed advantages of both the fractional-N technique and the Vernier-loop technique. Such a synthesizer was disclosed to provide both narrow frequency spacings when communicating through a satellite relay with a ground network or alternatively coarser channel spacings when communicating directly with a land-based station.

In this disclosure, an advantageous frequency synthesis arrangement using the teachings of the parent application is described for providing narrow frequency spacings for transmission alternately with providing coarse frequency spacings for reception when communicating with a land network with or without the use of an orbiting relay satellite, the communication method being an asymmetrical TDMA method according to the above incorporated documents.

SUMMARY OF THE DISCLOSURE

A wireless apparatus is described having a transmitter and a receiver controlled by a frequency synthesizer arrangement to operate on a transmit frequency channel and a receive frequency channel respectively. The transmit frequency channels are not spaced by the same amount in the transmit frequency band as the receive channels are spaced in the receive band, but by a sub-multiple of the receive channel spacing, for example.

The transmitter and receiver operate using time division duplex (TDD) so that the apparatus does not need to transmit and receive simultaneously. The inventive frequency synthesizer arrangement is used to provide a receive channel during the receiving period lying on a frequency raster having the receive channel spacing and is re-used in the transmit period to generate a transmit frequency lying on a raster spaced with the transmit channel spacing.

According to one aspect of the present invention, a first phase-lock-loop (PLL) synthesizer is used to generate a receiver local oscillator frequency in steps of the receive channel spacing, being a sub-multiple $F_{ref}/M1$ of a reference frequency standard $F_{ref}$. The first PLL synthesizer has a fast frequency changing speed due to the receive channel spacing being large, and the speed may be further enhanced using fractional-N techniques, permitting the first PLL synthesizer to change frequency in steps of $F_{ref}/M1$ between the reception period and the transmission period. During the transmission period, the first PLL synthesizer generates a frequency which is a multiple of $F_{ref}/M1$ while a second PLL synthesizer generates a frequency which is multiple of $F_{ref}/M2$, the output signal of the second PLL synthesizer being used in combination with the signal from the first PLL synthesizer to generate a transmit frequency in steps of $F_{ref}/(M1 \cdot M2)$, thus providing finer steps for transmit channel selection. M1 and M2 are preferably mutually prime integers of similar size, for example 5 and 4, and thus the second PLL synthesizer operates with similar stepsize to the first PLL synthesizer and has a similarly fast switching speed. The inventive arrangement has the advantage over the prior art of providing finer transmit channel steps while retaining a high switching speed and low phase noise for both first and second PLL synthesizers.

According to one embodiment of the present invention, an improved radio transmitter-receiver is disclosed for selecting receive frequency channels with a first frequency spacing alternately with selecting transmit frequency channels with a second frequency spacing. First local oscillator frequency synthesizer means which is programmable in frequency steps equal to the first frequency spacing generates a first local oscillator signal. A receiving means uses the first local oscillator signal in a first mixer to determine the frequency channel for reception. A transmit offset frequency synthesizer means, which is programmable in frequency steps equal to the second frequency spacing which is different from the first frequency spacing generates a transmit offset frequency signal. A transmit signal generator means uses the first local oscillator signal and the transmit offset frequency signal together with a modulating signal to produce a modulated transmit frequency signal on any selected transmit frequency channel.

According to another embodiment of the present invention a dual-mode device for communicating alternatively with a land-based cellular network base station or via an orbiting satellite with a satellite ground station is disclosed. A first local oscillator frequency synthesizer which is programmable in first frequency steps equal to a receive channel frequency spacing, generates a first local oscillator signal for receiving a signal from either a satellite or a cellular base station. A first receiver downconvertor uses the first local oscillator signal to produce a first intermediate signal. A second local oscillator synthesizer, which is programmable in second frequency steps different than the receive channel spacing, generates a transmit offset alternately with generating a second local oscillator frequency signal during a receive portion of a time division duplex cycle. A transmit modulator employing the transmit offset frequency signal together with the first local oscillator signal generates a modulated signal at a desired transmit channel frequency either in a frequency band for transmission via a satellite relay or in a frequency bank for transmission to a land-based cellular station.

BRIEF DESCRIPTION OF THE DRAWINGS

These and other features and advantages of the invention will be readily apparent to one of ordinary skill in the art from the following written description, used in conjunction with the drawings, in which.

DESCRIPTION OF THE PREFERRED EMBODIMENTS

Figure 1:
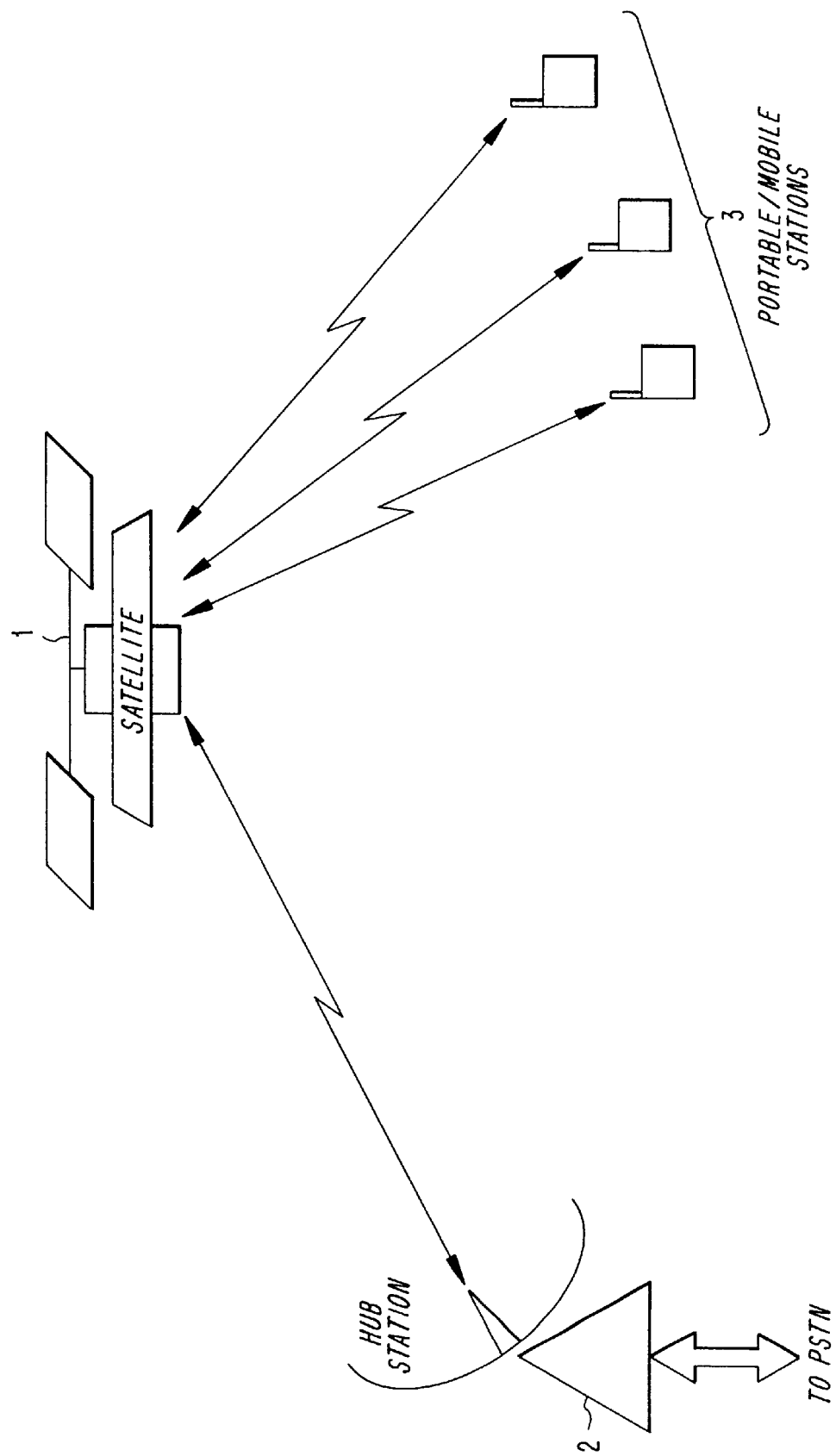
FIG. 1 illustrates a satellite communication system.

FIG. 1 illustrates a block diagram of satellite communications system. An orbiting satellite 1 is in communication with at least one ground station or outstations called the HUB 2 as well as with a number of portable mobile phones 3. The phones are each serviced by an appropriate antenna beam from a multiple spot-beam antenna on the satellite providing high gain in the direction of each phone. The HUB communicates with the satellite using, for example, C-band or Ka-band frequencies, while the satellite communicates with the phones using, for example, L-band (uplink) and S-band (downlink) frequencies. In most cases, most calls will be between satellite phones and ordinary phones belonging to the public switched telephone network. The HUB station accepts calls from the PSTN and relays them to the mobile phone via the satellite, and conversely accepts calls from the mobile phones relayed from the satellite and connects them to the PSTN. A small percentage of calls can be mobile to mobile calls, and the HUB directly connects them to each other without necessarily involving the PSTN. In some systems, two or more HUBS located in different parts of the world communicate with the same satellite. In this case, mobile to mobile calls may involve Hub-to--Hub connections which can be accomplished through international trunk lines that may be part of the PSTN system. Alternatively, the satellite HUB links can allocate some capacity for Hub-to-Hub communication via the satellite for such occurrences thus avoiding landline tariffs.

Figure 2:
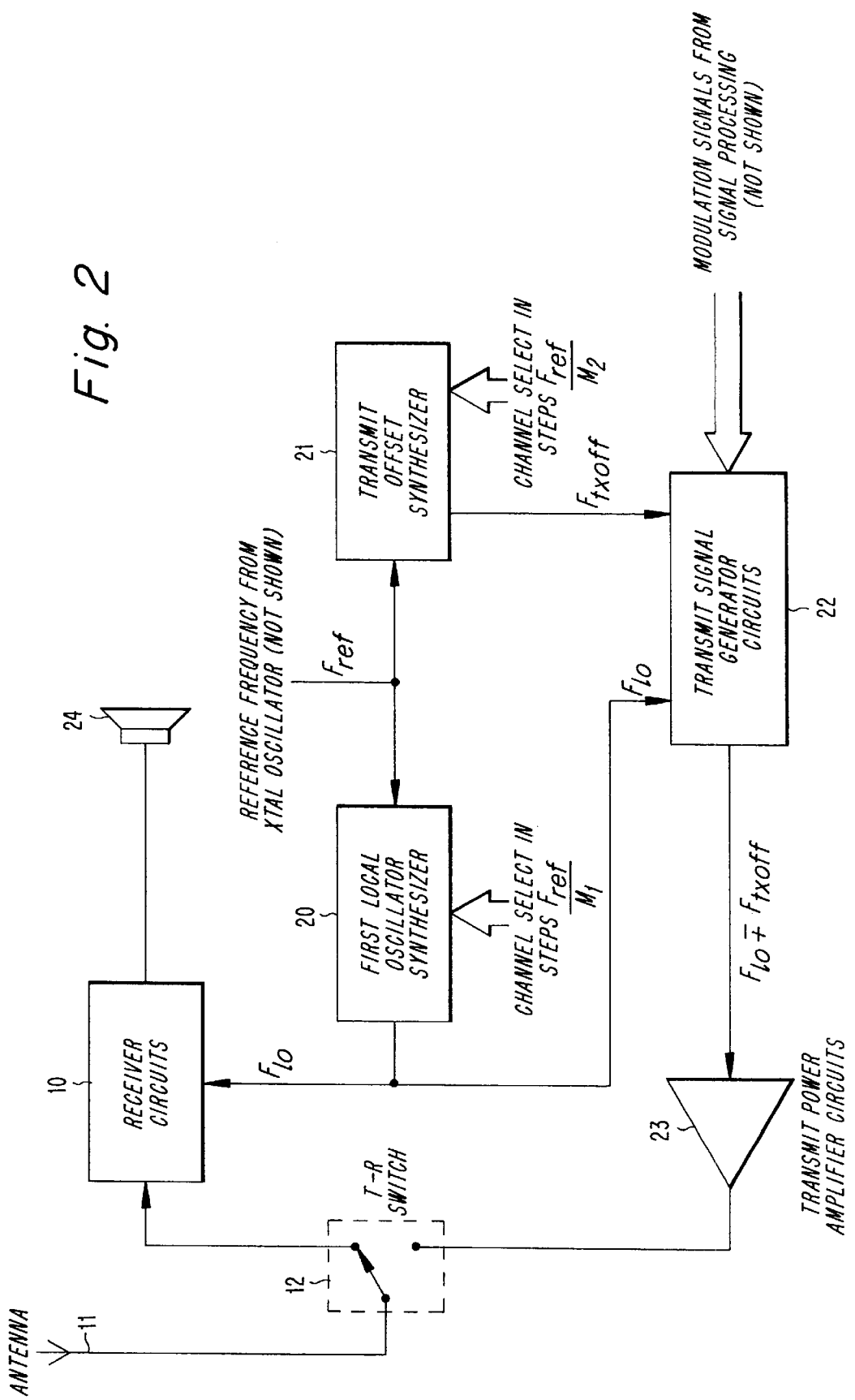
FIG. 2 illustrates a transmitter-receiver apparatus according to one embodiment of the present invention.

A block diagram of a portable phone according to the invention is shown in FIG. 2. Superheterodyne receiver circuits 10 connect through a transmit-receive switch 12 to an antenna 11 during a receive burst period while a first local oscillator 20 is programmed to select the desired receive frequency channel in steps of a reference frequency $F_{ref}$ divided by an integer M1.

During a transmit burst period, the transmit-receive switch 12 connects the antenna 11 to a transmitter power amplifier 23 which amplifies a transmit signal from the signal generator circuits 22. The transmit signal generator circuits 22 cause modulation information to appear on a frequency that is a combination of a frequency $F_{lo}$ from synthesizer 20 and a frequency $F_{txoff}$ from a transmit offset synthesizer 21. The synthesizer 21 may be programmed in steps of $F_{ref}/M2$ while the synthesizer 20 is programmed in steps of $F_{ref}/M1$ such that the combined frequency, for example the sum $F_{lo}+F_{txoff}$ or the difference $F_{lo}-F_{txoff}$, is at a desired transmit channel frequency which can be any multiple of $F_{ref}/(M1 \cdot M2)$. For example, suppose the synthesizer 20 generates steps of a 1 MHz reference divided by 5. ($F_{ref}=1$ MHz and M1=5). The receiver is then tunable to any receive channel in 200 KHz steps (1 MHz/5) by programming $F_{lo}$ to change in 200 KHz steps.

If the synthesizer 21 is now tuned in steps of 1 MHz divided by 4 (i,e, M2=4) then $F_{txoff}$ will vary in steps of 250 KHz. Thus by incrementing $F_{txoff}$ by one 250 KHz step and simultaneously decrementing $F_{lo}$ by one 200 KHz step, the sum $F_{lo}+F_{txoff}$ is caused to increment by the difference 250−200=50 KHz. By similar means the difference $F_{lo}-F_{txoff}$, if that is used for the transmit frequency, may be made to increment or decrement in steps of 50 KHz.

Figure 3:
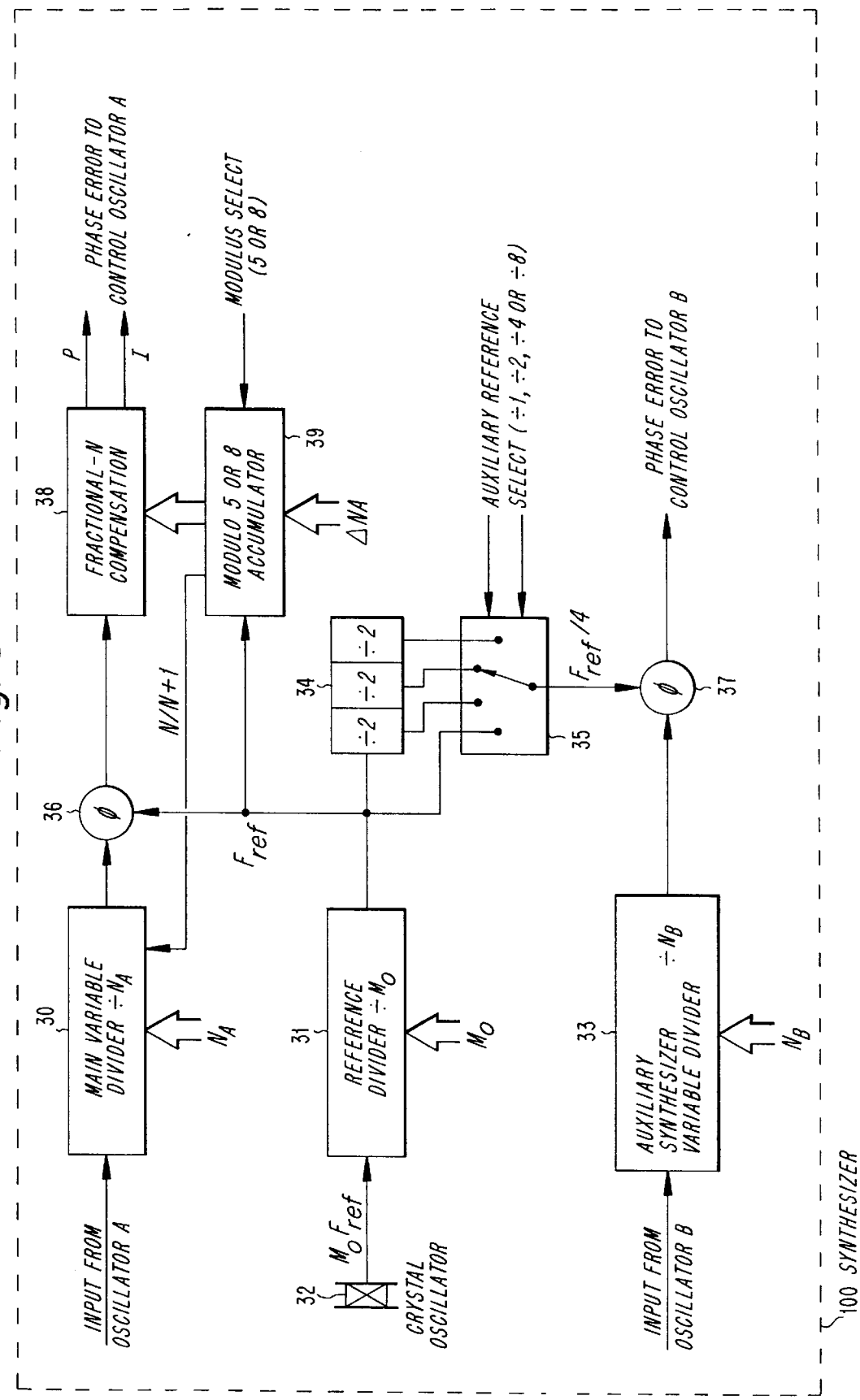
FIG. 3 illustrates a block diagram of a prior art synthesizer circuit.

FIG. 3 shows the simplified internal arrangement of the above-mentioned prior art synthesizer control circuit (Philips part number UM8025). A crystal oscillator at a frequency of, for example, 13 MHz provides a reference frequency signal to a reference divider 31. The reference divider 31 may be programmed to divide by any integer Mo within an allowed range. For example, choosing Mo=13 with a 13 MHz crystal makes $F_{ref}=1$ MHz.

The output frequency $F_{ref}$ from the reference divider 31 is connected to a first phase detector 36 along with the output of variable divider 30. The variable divider 30 is programmable to divide by an integer NA within a certain range of allowed values to divide a frequency (NA·$F_{ref}$) from an oscillator A (not shown) to obtain $F_{ref}$. The signal at $F_{ref}$ from the variable divider 30 and the reference divider 31 are phase compared in a phase comparator 36 to produce a phase error signal that is then used to control the oscillator A until the phase error is zero. As a result, the oscillator is thereby locked in frequency to an exact multiple NA of the frequency $F_{ref}$. The main synthesizer also incorporates a fractional-N accumulator 39 and fractional-N compensation circuits 38 to allow the oscillator to be controlled in finer steps given by ΔNA·$F_{ref}$ as well as the coarser steps NA·$F_{ref}$. A modulo-accumulator 39 may be set to accumulate values ANA presented to it using either modulo-5 or modulo-8 wraparound arithmetic. In the modulo-5 mode, ANA may take on the values 0 to 4 inclusive. The operation of such a fractional-N arrangement is more fully described in the incorporated references, and results in being able to change the frequency of the oscillator A in steps of $F_{ref}/5$ (or $F_{ref}/8$ in modulo-8 mode). With a 13 MHz crystal, Mo=13 and modulo-5 accumulation, the frequency steps produced are therefore 1 MHz/5=200 Khz for the oscillator A.

The output from the reference divider 31 is also fed to three cascaded divide-by-2 circuits 34 and a selector switch 35 may be programmed to select either $F_{ref}$, $F_{ref}/2$, $F_{ref}/4$ or $F_{ref}/8$ to be passed to a phase comparator 37. For example, selecting $F_{ref}/4$ with $F_{ref}$ equal to 1 MHZ results in the phase detector 37 having a 1 MHz/4=250 KHz input frequency.

An auxiliary variable divider 33 may be independently programmed to divide the signal frequency NB·$F_{ref}/4$ from a second oscillator B by an integer NB to produce a second input at $F_{ref}/4$ to the phase comparator which is compared with the first input and a phase error signal generated to control the oscillator B accurately to the desired frequency NB·$F_{ref}/4$. With the settings illustrated in FIG. 3 and described above, the prior art synthesizer 100 is thus suitable for use in the current invention to realize a radio transmitter receiver having 200 KHz receive channel spacing and 50 KHz transmit channel spacing.

Figure 4:
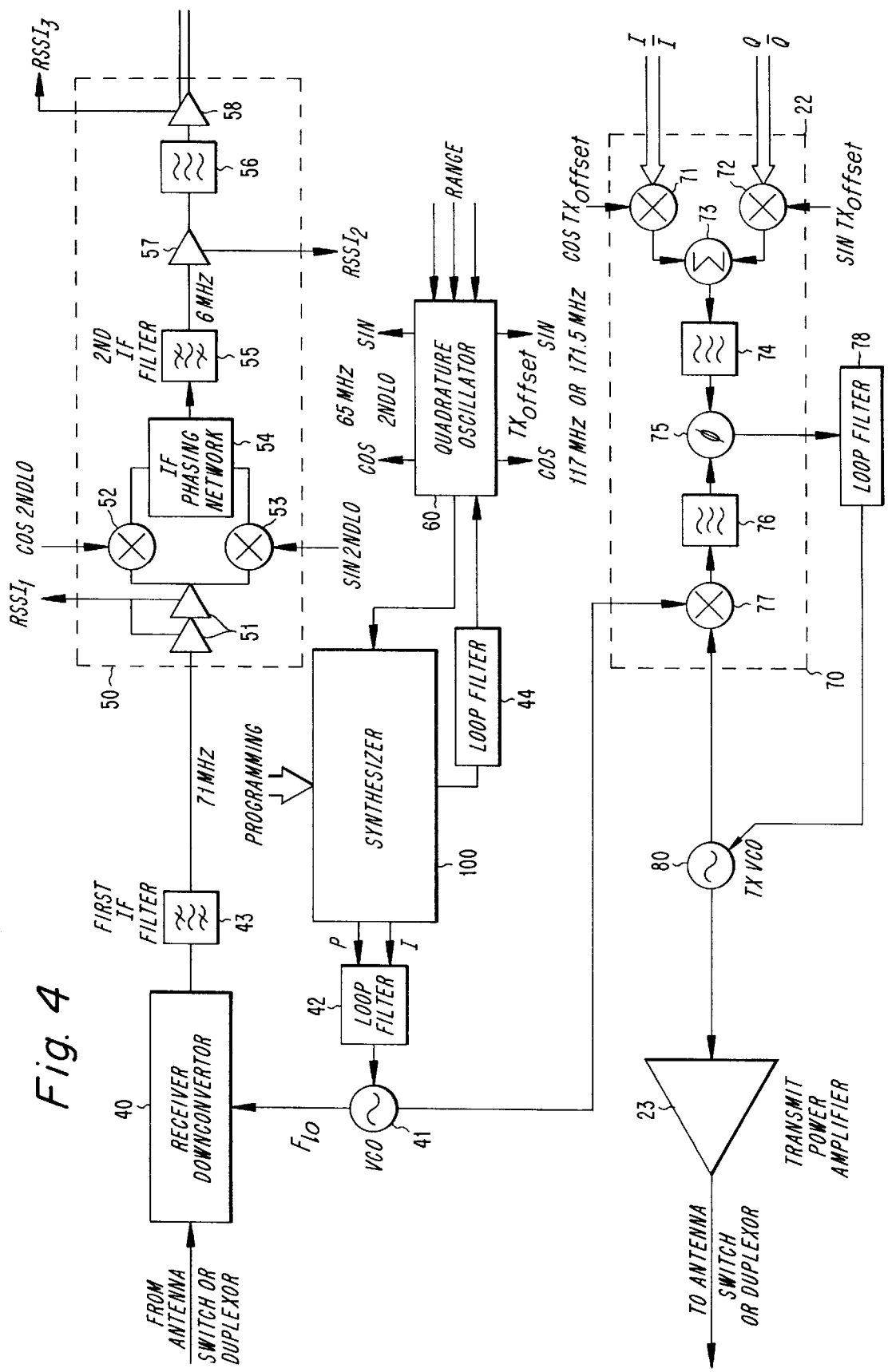
FIG. 4 illustrates a dual wideband/narrowband phone according to one embodiment of the present invention.

FIG. 4 shows a more specific implementation of a portable phone according to one embodiment of the present invention using synthesizer 100 of FIG. 3 to obtain different channel spacings in the transmit and receive directions. The phone may, for example, be a dual-mode, satellite/cellular phone that can operate both according to the European GSM standard for digital mobile communications having 200 KHz channel spacing for both directions of communications and to a derived satellite communications standard having 200 KHz downlink channel spacings but 50 KHz uplink channel spacings. In this case, the receive downconvertor 40 shall be understood as having the capability to receive and convert a signal either in a GSM cellular frequency band or in a satellite frequency band to the first Intermediate Frequency (IF), for example 71 MHz. Likewise the antenna arrangements, the transmit power amplifier 23, the voltage controlled oscillators (VCOs) 41,80, transmit signal generator circuits 22 and the quadrature oscillator 60 shall be understood to have the capability to operate in all frequency bands of interest, if necessary, by including separate circuitry for different frequency bands in these blocks and selectively enabling the circuitry for a desired operational frequency band.

The receiver local oscillator is comprised of a synthesizer 100, a VCO 41 and a loop filter 42 and may be programmed to generate frequencies in 200 KHz steps for receiving a signal from either a landbased station or a satellite. The local oscillator frequency is used in the downconvertor 40 to convert the received signal to the first intermediate frequency IF of 71 MHz where it is filtered using a first IF filter 43. The filtered IF signal is applied to receive IF circuits 50 which comprise a first IF amplifier 51, image rejection second downconvertors 52,53,54, second IF filters 55,56 and second IF amplifiers 57,58. The second intermediate frequency is, for example, 6 MHz, and is produced by mixing the 71 MHz first IF signal with a 65 MHz signal from the quadrature oscillator 60. The quadrature oscillator 60 produces simultaneously a cosine and a sine signal, i.e., it has two outputs phased 90 degrees relatively to each other. The cosine and sine signals each drive respectively one of the mixers 52 and 53 at their switching or local oscillator inputs. Because these mixer inputs are commonly driven to saturation, the cosine and sine signals may be substituted with square-wave signals that are offset from one another by one quarter of a cycle. The first IF signal drives the "linear" inputs of the mixers. The mixer output signal is fed to a second IF phasing network 54 where the output signals are phase shifted relative to each other by approximately 90 degrees across the second IF bandwidth of interest as defined by the filter 55, and additively combined in the second IF phasing network 54. The effect of this known mixer arrangement is that constructive combination occurs for input signals with frequencies lower than the quadrature oscillator frequency while destructive combination (cancellation) occurs for input signal frequencies above the quadrature oscillator frequency, or vice versa depending on whether the phase shift network provides a +90 or a −90 degree relative phase shift prior to combination. The image rejection mixer thus provides a means to select signal frequencies from one side of the local oscillator frequency only, rejecting the image on the other side, which on some occasions may correspond to an unwanted interfering signal.

The cosine and sine components are useful in image rejection mixers 52,53,54 as well as in quadrature modulators 71,72,73 which are further described in U.S Pat. No. 07/967,027 entitled "Multi-mode Signal Processing" and more fully in a continuation-in-part to that application U.S. patent application Ser. No. 08/305,702, entitled "Improved I/Q Modulator," both of which are hereby incorporated herein by reference. The quadrature oscillator has a wide frequency tuning range which may be centered alternately around 65 MHz, 117 MHz or 171.5 MHz by range control inputs, for reasons which will become apparent. Around the selected range, the frequency may be controlled in 250 KHz steps by means of synthesizer 100 as described above.

Since the apparatus of FIG. 4 operates in a time-division-duplex (TDD) mode, the quadrature oscillator may be re-used and reprogrammed from transmit to receive to generate in the receive direction the cosine and sine signals at a second local oscillator frequency (e.g. 65 MHz) for the image rejection second downconvertor alternatively the cosine and sine signals at the transmit offset frequency of 117 MHz (GSM mode) or 171.5 MHz (satellite mode) required by the quadrature modulators 71,72,73.

The operation of transmit signal generator circuits 22 will now be described. As previously described in the incorporated documents, two main schemes for producing a transmit signal may be used as the signal modulation may or may not be constant amplitude modulation. The constant envelope case is preferred for reasons of efficiency of the power amplifier 23 and is illustrated in FIG. 4. A modulated signal is produced first at the transmit offset frequency synthesized by the synthesizer 100,44,60 using the quadrature modulator 71,72,73. A transmit VCO 80 which runs at the final transmit frequency drives the transmit power amplifier 23 and its phase is required to follow the desired phase modulation waveform impressed on the transmit offset frequency signal. The transmit VCO 80 signal is mixed with a signal from the VCO 41 in a transmit mixer 77 to obtain another signal at the transmit offset frequency. This signal is phase compared with the modulated signal in phase comparator 75 to produce a phase error signal that, through loop filter 78 is fed back to the VCO 80 forcing the VCO 80 to follow the desired phase modulation with low error. The transmit frequency is thus either $F_{lo}+TX_{offset}$ or $F_{lo}-TX_{offset}$ according to whether $F_{lo}$ is lower or higher than the transmit frequency desired.

In GSM operation in the 900 MHz band, the transmit-receive channel spacing is always equal to 45 MHz, known as the duplex spacing. The transmit frequency channel is the lower frequency by 45 MHz. If the VCO 41 frequency $F_{lo}$ lies above the receive channel by the 71 MHz first IF, the transmit channel being a further 45 MHz lower than the receive frequency is thus 116 MHz below the frequency $F_{lo}$. Thus the required value of $TX_{offset}$ produced by the quadrature oscillator in transmit is 116 MHz for GSM. On the other hand, it is permissible to alter the frequency $F_{lo}$ by a small amount such as 1 MHz between receive and transmit to make the required value of $TX_{offset}$ equal to 117 MHz. The purpose of this is to make both the second LO frequency (65 MHz) and the $TX_{offset}$ frequency multiples of the 13 MHz crystal reference, which then in certain other implementations allows those frequencies to be derived by direct frequency multipliers from the crystal reference. In the present implementation, either 116 MHz or 117 KHz would be suitable choices for $TX_{offset}$, and it may also be mentioned that a first IF of 72 MHz combined with a second LO frequency of 78 MHz are also possible choices giving the same 6 MHz second IF, but yielding $TX_{offset}$=117 MHz and thus avoiding the need for a 1 MHz sidestep of the VCO 41 between receive and transmit.

In a particular satellite mode the nominal receive-transmit spacing (the duplex spacing) is 101.5 MHz. In this case, the transmit frequency lies above the receive frequency by approximately 101.5 MHz. If the local oscillator VCO 41 operates at a frequency below the receive frequency by 71 MHz in that mode, then the required transmit frequency will be 71+101.5=172.5 MHz above the local oscillator frequency, requiring $TX_{offset}$=172.5 MHz to be produced by the quadrature oscillator 60 in that mode.

In the satellite mode, uplink channels are available in frequency steps of 50 KHz combined with a choice of one of four timeslots, while corresponding downlink channels are available in frequency steps of 200 KHz combined with a choice of 1 of 16 timeslots, according to the asymmetrical access methods described in allowed U.S. Pat. No. 5,539,730 which is incorporated herein by reference. By programming synthesizer 100 to control the frequency $TX_{offset}$ of the quadrature oscillator 60 in 250 KHz steps and simultaneously programming it to control the oscillator 41 in 200 KHz steps, the transmit frequency generated by the VCO 80 is controllable in 50 KHz steps according to this invention.

Furthermore, in the GSM landcellular mode, since $TX_{offset}$ and the second LO frequency are both integer multiples of 1 MHZ, selector switch 35 can be placed to select $F_{ref}$ (1 MHz) to pass to a phase comparator 37 in that mode. This may also be done for the receive part of a satellite TDMA cycle, or whenever the value of $TX_{offset}$ in satellite operation falls on an integer multiple of 1 MHZ. Care must be taken in dynamically changing the reference frequency passed to the phase comparator 37, since this will affect the loop bandwidth and dynamics of the auxiliary synthesizer loop 33,37,44,60. The loop filter 44 must be designed to operate satisfactorily with regard to phase noise, microphony, switching speed and stability in all combinations of quadrature oscillator range and reference frequency to the phase comparator 37 whose requirements are however much more easily met when practicing the invention.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A communication device, comprising:
    a receiver that receives information over receive frequency channels separated by a first frequency spacing;
    a first local oscillator frequency synthesizer programmable in frequency steps equal to the first frequency spacing to generate a first local oscillator signal that tunes the receiver to receive information during receive burst periods;
    a transmitter that transmits information over transmit frequency channels separated by a second frequency spacing different from the first frequency spacing; and
    a transmit offset frequency synthesizer programmable in frequency steps equal to said second frequency spacing to generate a transmit offset frequency signal, wherein the transmitter is tuned by said first local oscillator signal and said transmit offset frequency signal to transmit a modulated transmit frequency signal during transmit burst periods that are alternating relative to the receive burst periods for communicating the information in a time division duplex manner.

2. The communication device according to claim 1, wherein said first local oscillator frequency synthesizer comprises a fractional-N synthesizer operating at a first frequency channel spacing.

3. A communication device, comprising:
    a receiver that receives information over receive frequency channels separated by a first frequency spacing;
    a first local oscillator frequency synthesizer programmable in frequency steps equal to the first frequency spacing to generate a first local oscillator signal that tunes the receiver to receive information during receive burst periods;
    a transmitter that transmits information over transmit frequency channels separated by a second frequency spacing different from the first frequency spacing; and
    a transmit offset frequency synthesizer programmable in frequency steps equal to a third frequency spacing different than said first and second frequency spacings to generate a transmit offset frequency signal, wherein the transmitter is tuned by said first local oscillator signal and said transmit offset frequency signal to transmit a modulated transmit frequency signal during transmit burst periods that are alternating relative to the receive burst periods for communicating the information in a time division duplex manner.

4. The communication device according to claim 3, wherein said second frequency spacing is the difference between said first and third frequency spacings.

5. The communication device according to claim 3, wherein said second frequency spacing is the sum of said first and third frequency spacings.

6. The communication device according to claim 3, wherein said first local oscillator frequency synthesizer comprises a fractional-N synthesizer having a phase comparator operating at a frequency equal to a first integral multiple of said first channel spacing.

7. The communication device according to claim 6, wherein said phase comparator operating frequency is also a second integer multiple of said third frequency spacing.

8. An improved radio transmitter-receiver for selecting receive frequency channels alternately with selecting transmit frequency channels, comprising:
    first local oscillator frequency synthesizer means programmable in first frequency steps equal to a first frequency spacing to generate a first local oscillator signal;
    first receiver downconvertor means using said first local oscillator signal in a first mixer to produce a first IF signal;
    quadrature oscillator means programmable in second frequency steps different than said first channel spacing to generate cosine and sine signals at a transmit offset frequency during a transmit portion of a communication cycle alternately with generating cosine and sine signals at a receive second local oscillator frequency during a receive portion of the communication cycle;

image-rejection second downconvertor means employing said cosine and sine signals to heterodyne convert said first IF signal to a second IF signal; and transmit modulator means using said cosine and sine signals together with said first local oscillator signal to generate a modulated signal at a desired transmit channel frequency.

9. The improved radio transmitter-receiver according to claim 8, wherein said first local oscillator frequency synthesizer is a fractional-N synthesizer having a phase comparator operating at a frequency equal to a first integer multiple of said first frequency spacing.

10. The improved radio transmitter-receiver according to claim 9, wherein said second frequency steps are equal to said phase comparator operating frequency.

11. The improved radio transmitter-receiver according to claim 9, wherein said second frequency steps are equal to a second integer multiple of said phase comparator operating frequency.

12. The improved radio transmitter-receiver according to claim 9, wherein said phase comparator operating frequency is equal to a second integer multiple of said second frequency steps.

13. An improved radio transmitter-receiver for selecting receive frequency channels alternately with selecting transmit frequency channels, comprising:

first local oscillator fractional-N frequency synthesizer means having a phase comparator operating a frequency equal to an integer multiple of a desired receive channel frequency spacing and programmable in steps equal said receive channel spacing to generate a first local oscillator signal;

first receiver downconvertor means using said first local oscillator signal in a first mixer to produce a first IF signal;

second local oscillator synthesizer means programmable in second frequency steps different than said receive channel spacing to generate a transmit offset frequency signal during a transmit portion of a communication cycle alternately with generating a receiver second local oscillator frequency signal during a receive portion of the communication cycle;

second receiver downconvertor means employing said second local oscillator signal to heterodyne convert said first IF signal to a second IF signal; and transmit modulator means employing said transmit offset frequency signal together with said first local oscillator signal to generate a modulated signal at a desired transmit channel frequency.

14. A dual-mode radiotelephone device for communicating alternatively with a land-based cellular network base station or via an orbiting satellite with a satellite ground station, comprising:

first local oscillator frequency synthesizer means programmable in first frequency steps equal to a receive channel frequency spacing to generate a first local oscillator signal for receiving a signal from either a satellite or a cellular base station;

first receiver downconvertor means using said first local oscillator signal in a first mixer to produce a first IF signal;

second local oscillator synthesizer means programmable in second frequency steps different than said receive channel spacing to generate a transmit offset frequency signal during a transmit portion of a time-division-duplex cycle alternately with generating a second local oscillator frequency signal during a receive portion of a time division duplex cycle; and transmit modulator means employing said transmit offset frequency signal together with said first local oscillator signal to generate a modulated signal at a desired transmit channel frequency either in a frequency band for transmission via a satellite relay or in a frequency band for transmission to a land-based cellular station.

15. The dual-mode radiotelephone according to claim 14, wherein said second frequency steps are equal to a transmit channel spacing for transmission via said satellite.

16. The dual-mode radiotelephone according to claim 14, wherein said desired transmit channel for transmission via said satellite is any one of a number of channel with a frequency spacing equal to the difference between said receive channel spacing and said second frequency step size.

* * * * *